United States Patent

Wen

[11] Patent Number: 5,841,459
[45] Date of Patent: Nov. 24, 1998

[54] COLOR-TO-COLOR REGISTRATION IN THERMAL PRINTERS BY ADJUSTING IMAGE RESOLUTION BASED ON IMAGE CONTENT

[75] Inventor: Xin Wen, Rochester, N.Y.

[73] Assignee: Eastman Kodak Company, Rochester, N.Y.

[21] Appl. No.: 637,315

[22] Filed: Apr. 24, 1996

[51] Int. Cl.$^6$ .................................. B41J 2/325
[52] U.S. Cl. .................. 347/176; 347/188; 347/211; 400/120.04; 400/120.09
[58] Field of Search .................. 347/176, 188, 347/211; 400/120.02, 120.04, 120.09

[56] References Cited

U.S. PATENT DOCUMENTS

| | | | |
|---|---|---|---|
| 2,924,646 | 2/1960 | Gleason | 178/5.2 |
| 4,630,069 | 12/1986 | Erlichman | 346/79 |
| 4,737,860 | 4/1988 | Ono et al. | 347/188 |
| 4,800,399 | 1/1989 | Long et al. | 346/76 |
| 4,833,124 | 5/1989 | Lum | 347/188 |
| 4,843,409 | 6/1989 | Matsuzaki | 346/76 |
| 4,990,930 | 2/1991 | Ludden et al. | 346/1.1 |
| 5,176,458 | 1/1993 | Wirth | 400/120 |
| 5,191,356 | 3/1993 | Shibamiya | 347/188 |
| 5,400,059 | 3/1995 | Kwon | 347/184 |
| 5,493,321 | 2/1996 | Zwaldo | 347/188 |
| 5,675,370 | 10/1997 | Austin et al. | 347/211 |
| 5,686,998 | 11/1997 | Clark et al. | 347/188 |

Primary Examiner—Jeffrey L. Sterrett
Attorney, Agent, or Firm—Walter S. Stevens

[57] ABSTRACT

A color thermal dye transfer printer that produces superposed color plane images of varying image densities on a receiver medium includes a printhead movable in a print direction relative to the receiver medium to produce images on the receiver medium at a printing rate, the images being of selectable resolution along the print direction. The image density of each color plane image is determined, and the image resolution for each color plane is set according to the image densities of the color plane images. The image resolution may be set by adjusting the angular velocity of the media drive motor, by adjusting the velocity of relative movement of the printhead relative to the receiver medium, or by adjusting the printing rate. Each color plane image may be divided into a plurality of sectors of varying image densities. The image density of each color plane image in respective sectors is determined; and the image resolution is set for each color plane image in respective sectors according to the image densities of the color plane sector images.

17 Claims, 5 Drawing Sheets

COLOR-TO-COLOR REGISTRATION IN THERMAL PRINTERS BY ADJUSTING IMAGE RESOLUTION BASED ON IMAGE CONTENT

BACKGROUND OF THE INVENTION

1. Technical Field

This invention relates generally to hard copy color output devices such as thermal printers, and more particularly to an improvement of color-to-color registration in such printers.

2. Background Art

Thermal printers are well known. Typically, they comprise a cylindrical platen or drum for advancing a print receiver medium and a dye-bearing donor medium past a thermal printhead. Commonly, the receiver medium is plain or coated paper sheets, while the dye donor medium is in continuous web form. The dye donor medium is acted upon by the printhead to transfer dye to the receiver medium.

The printhead usually comprises a linear array of closely spaced printing elements, and spans the transfer drum at the print zone. Each heating element can be an electrical resistor, selectively energized to raise the temperature of the heating element to the level required to cause dye to transfer to the receiver. Alternatively, the printing elements may comprise a linear array of electrically conductive elements which cooperate with a "resistor" donor web to thermally print image information. Such a printhead is disclosed in U.S. Pat. No. 4,800,399.

In either case, by selectively addressing the printing elements in the printhead array, an entire line of image information is printed at once. To produce continuous-tone images in which each picture element (referred to as "pixel") of an image line exhibits any one of a multitude of different density levels, the duration of the current applied to each printing element is varied, either by varying the width of the current pulse or by varying the total number of current pulses within the time interval allotted to print an image line. The amount of dye transferred from the dye donor medium to the receiver medium by this process is a function of temperature, pressure, media efficiency, and the duration of time over which the temperature and pressure are applied.

In continuous-tone thermal printers, it is common to continuously advance the receiver medium relative to the head during the line printing operation. Such movement enhances the print quality by blending the pixels of adjacent image lines together. Moreover, it prevents sticking of the heating elements to the donor web. Continuous movement of the receiver media is usually effected by a precision stepper motor which advances the print drum at a substantially constant rate which is sufficiently slow to allow each pixel in a line to receive the maximum gray level density (e.g. 256 levels of gray).

In order to achieve an acceptably high print density, the printing line rate in thermal printers must be rather slow in comparison to other printers, such as laser printers, used to produce mainly black and white text or simple binary graphics.

The line rate is usually fixed, and is chosen to accommodate the possibility that high density will be called for somewhere in the image. As may be appreciated, the requirement to move the receiver medium at a rate no faster than required to produce a maximum density image on each line has a limiting effect on the rate at which prints can be produced. However, some efforts have been made to increase the productivity by providing a variable line rate, wherein the time period allotted for each line is just sufficient to accommodate the maximum density of the pixels in that line; see U.S. Pat. No. 5,400,059.

A full color image is formed by repeating the entire printing cycle for several color patches included on the dye donor medium. The number of color planes used is typically three or four, depending on the printer, including cyan, magenta, yellow, and sometimes black (C,M,Y,K). The final color image on the receiver medium is composed of three overlapping color planes. Because each dye donor color patch is printed in a separate pass, the registration between the color planes is a critical issue for thermal printers.

One major cause for the mis-registration is the density difference between the cyan, magenta, yellow, and black color planes in a typical color image. Due to the difference in the densities for each color, a different amount of heat is applied to each dye donor color patch, and to each specific region of each dye donor color patch, during printing. Since the friction between the printhead and the dye donor medium is temperature dependent, each dye donor patch, and to some extent each specific region of each dye donor patch, experiences a different drag force during printing. As a result, the receiver medium tends to move at a slightly different speed for each color plane, which results in color mis-registration in the final image.

The conventional solution is to use a pair of pinch rollers to grab and pull the receiver medium so as to mechanically register the color images. However, even when the receiver medium is physically held by the pair of pinch rollers, there is a measurable effect of the different drag forces resulting from different print densities between color planes (and even between different sectors of each color plane) to cause mis-registration effects.

Because the printer market demands low cost, photographic quality printers, there is a desire for the reduction of mechanical parts such as the pinch rollers that are used in high-end printers. However, the mis-registration problems would be increased without such parts, and there has been a reluctance in the industry to do anything that would have a negative impact on the quality of the image.

DISCLOSURE OF THE INVENTION

The present invention provides a novel technique that improves the registration between color planes.

According to a feature of the present invention, a color thermal dye transfer printer that produces superposed color plane images of varying image densities on a receiver medium includes a printhead movable in a print direction relative to the receiver medium to produce images on the receiver medium at a printing rate, the images being of selectable resolution along the print direction. The image density of each color plane image is determined, and the image resolution for each color plane is set according to the image densities of the color plane images.

In preferred embodiments of the present invention, the image resolution is set by adjusting the angular velocity of the media drive motor, by adjusting the velocity of relative movement of the printhead relative to the receiver medium, or by adjusting the printing rate.

According to another feature of the present invention, a color thermal dye transfer printer for producing superposed color plane images of varying image densities on sectors of a receiver medium includes a printhead movable in a print direction relative to the receiver medium to produce images on respective sectors of the receiver medium at a respective printing rate. The images are of selectable resolution along the print direction. The image density of each color plane image in respective sectors is determined; and the image resolution is set for each color plane image in respective sectors according to the image densities of the color plane sector images.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
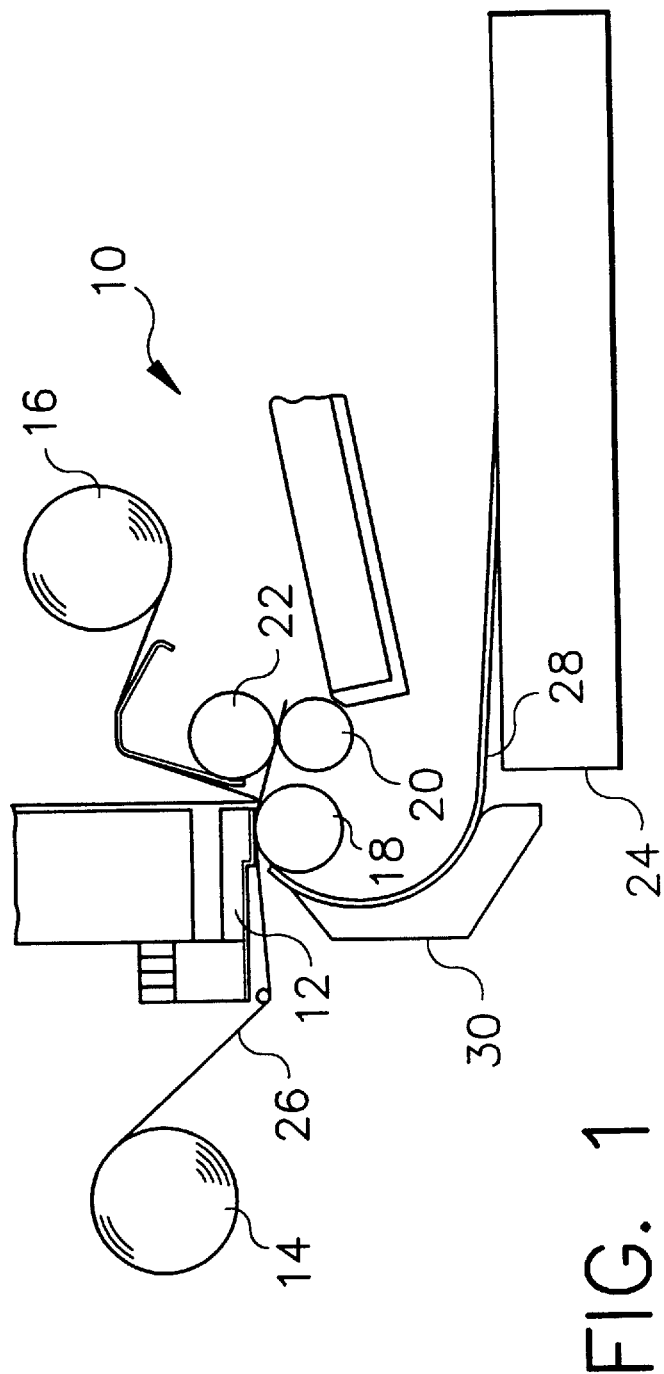
FIG. 1 is a schematic of a thermal printer which can be employed to make color images in a dye receiver medium in accordance with this invention.

Referring to FIG. 1, a thermal printer 10 according to a preferred embodiment of the present invention includes a printhead assembly 12, dye donor medium supply and take-up spools 14 and 16, respectively, a roller platen assembly 18, a pair of pinch rollers 20 and 22, a dye receiver medium transport guide 30, and a dye receiver medium supply 24.

Normal thermal printer operations include loading dye receiver medium, printing information upon the dye receiver medium and ejecting the finished print. Each of these operations is fully described in co-assigned U.S. Pat. No. 5,176,458, which issued to H. G. Wirth on Jan. 5, 1993. The disclosure of that patent is hereby incorporated into this specification by reference, and therefore only a brief description will be herein given of the illustrated embodiment of the thermal printer.

Printer operation begins with a loading phase, in which printhead assembly 12 moves to a loading position, a sheet 28 of dye receiver medium advances to a printing location, and printhead assembly 12 is positioned in preparation for the printing operation.

A sheet of dye receiver medium moves forward from supply 24 to guide 30, where it follows a curved path toward a gap between printhead assembly 12 and platen assembly 18. As the dye receiver medium moves into this gap, it contacts a dye donor medium 26. The leading edge of sheet 28 is held in the nip of rollers 20 and 22. While this embodiment describes dye receiver medium in sheet form, dye receiver medium supplied in roll form could also be utilized.

When the loading phase is completed, printer 10 enters a printing phase. Printhead assembly 12 moves toward platen assembly 18, pressing dye donor medium 26 and the dye receiver medium 28 against platen assembly 18 to form a sandwich for thermal printing.

Figure 2:
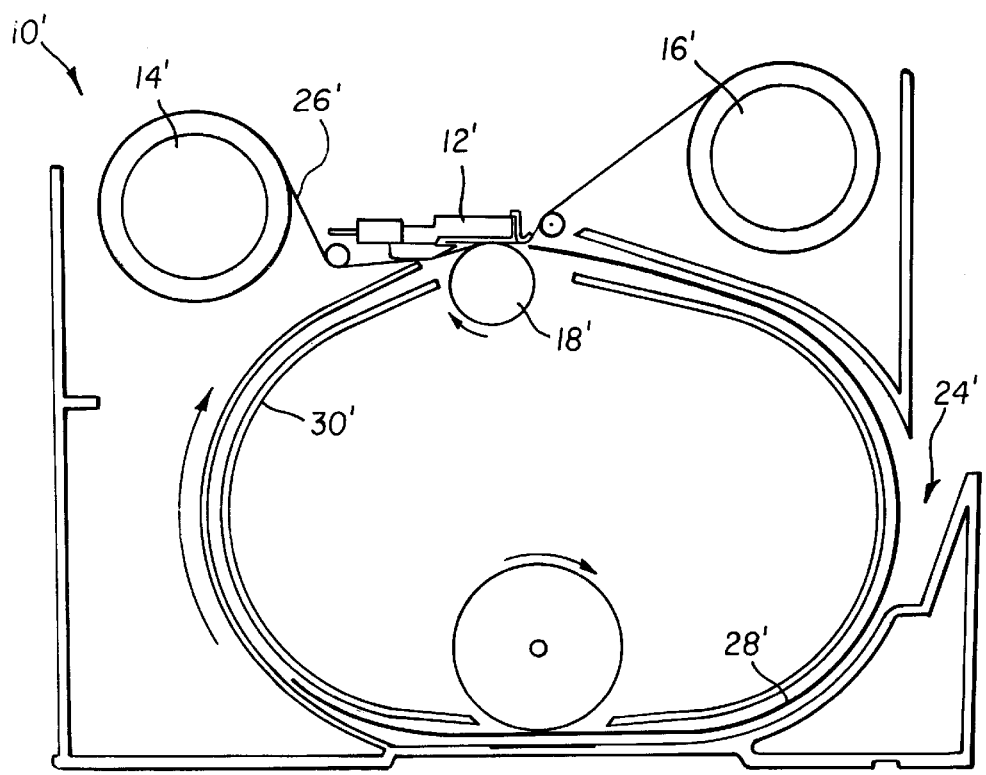
FIG. 2 is a schematic of another embodiment of a thermal printer which can be employed to make color images in a dye receiver medium in accordance with this invention.

Referring to FIG. 2, a thermal printer 10' according to a second preferred embodiment of the present invention includes a printhead assembly 12', dye donor medium supply and take-up spools 14' and 16', respectively, a roller platen assembly 18', a dye receiver medium transport guide 30', and a dye receiver medium supply slot 24'.

A sheet 28' of dye receiver medium moves forward from supply slot 24' through guide 30' toward a gap between printhead assembly 12' and platen assembly 18'. As the dye receiver medium moves into this gap, it contacts a dye donor medium 26'. The receiver medium sheet continues around the path defined by guide 30' several times, passing printhead assembly 12' for each color plane image.

Figure 3:
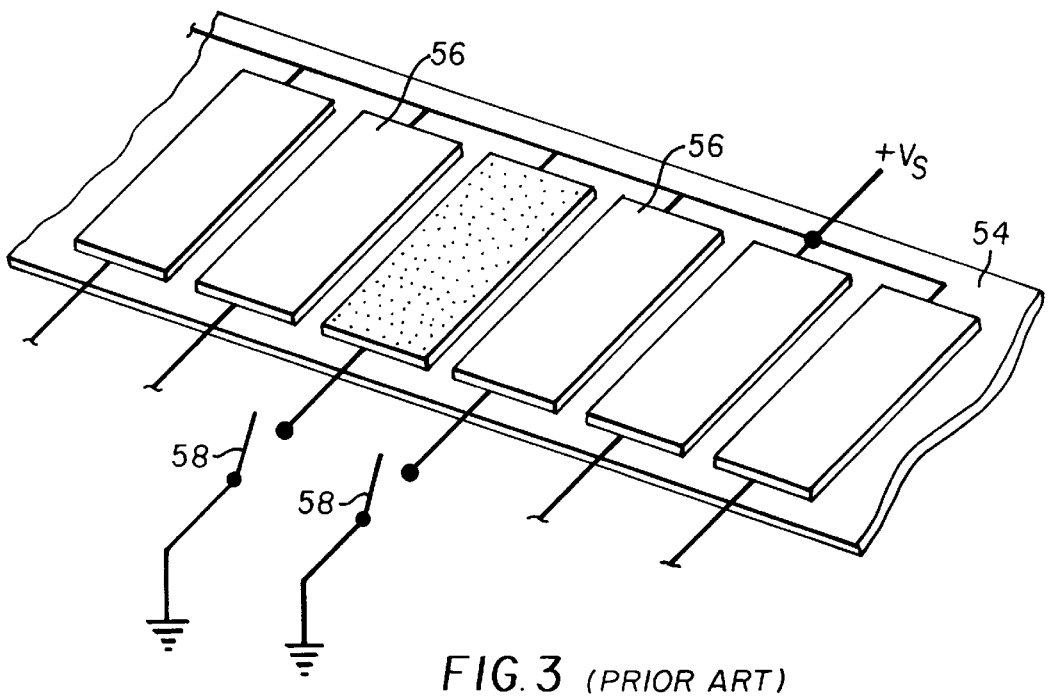
FIG. 3 is a schematic perspective of several heating elements used in the printhead of the printers of FIGS. 1 and 2.

Referring to FIG. 3, the printhead of printhead assembly 12 or 12' includes a plurality of heating elements 56, such as electrical resistors, which are pressed against dye donor web 54 to force the dye donor medium against dye receiver medium. When one of a plurality of switches 58 is closed, the associated heating element 56 is connected to a voltage potential source $V_s$. The amount of dye transferred is a function of the time period that switch 58 is closed.

Dye donor web 54 comprises a leader portion followed by a repeating series of dye frames. Each series includes in sequence yellow, magenta, cyan, and sometimes black dye frames. A single series is of course used to produce one color print on the dye receiver medium.

In this disclosure, the term "dye" refers to a colored material which transfers from the dye donor medium to a dye receiver medium in response to energy applied by individual elements of the printhead. Although the printhead is shown as having electrically resistive heating elements 56, those skilled in the art will understand that other sources of energy have been and can be effectively used in accordance with this invention. After a color plane is formed on the dye receiver medium, the dye receiver medium will be referred to as a print.

According to the present invention, color registration can be improved greatly by setting printing parameters according to the densities of the C, M, Y color planes. The image resolution "R" measured in lines per inch on the final image is a function of the printing rate "u" in lines printed per second and of the receiver medium velocity "v" in inches per second; or:

$$R=u/v.$$

The velocity "v" of the receiver medium depends not only on the angular velocity "ω" of the motor that transports the receiver medium, but also on the dye density of each color plane. That is, color mis-registration problem can be attributed to the density dependence of the friction force between the printhead and dye donor web 54, which in turn causes variation of the receiver medium velocity "v" from color plane to color plane. Changes in the velocity "v" of the receiver medium results in different image resolution "R" for different color planes.

It is a feature of the present invention that the image densities of each color plane can be computed either in the host computer or in the printer before printing. Based on the results of this computation, the motor angular velocity "ω" (and thus receiver velocity "v"), or the printing rate "u" can be modified so that the image resolution "R" stays constant for all color planes, which assures the registration among the different color planes.

Figure 4:
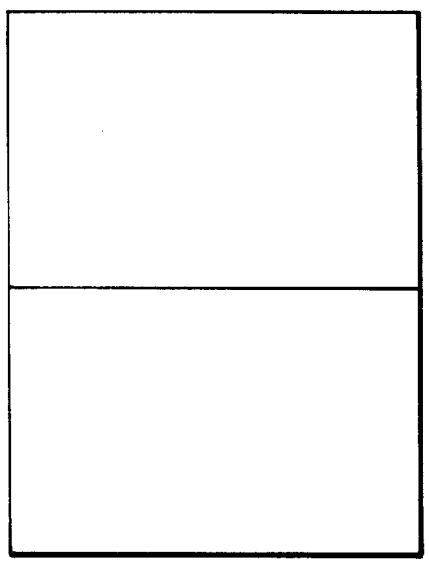
FIGS. 4–7 show receiver media with different sector layouts within a printed image.

It is another feature of the present invention to apply the image resolution correction to different sectors of each color plane. Examples of sector layouts in an image are shown in FIGS. 4 to 7, wherein it is assumed that the illustrated receiver medium travel through the printer in the direction from bottom of the figures to the top of the figures. In FIG. 4, two sectors divide the image in the down-the-page direction. The densities from the two sectors can be used to determine the motor speed or the printing speed in each sector within each dye donor patch.

Figure 5:
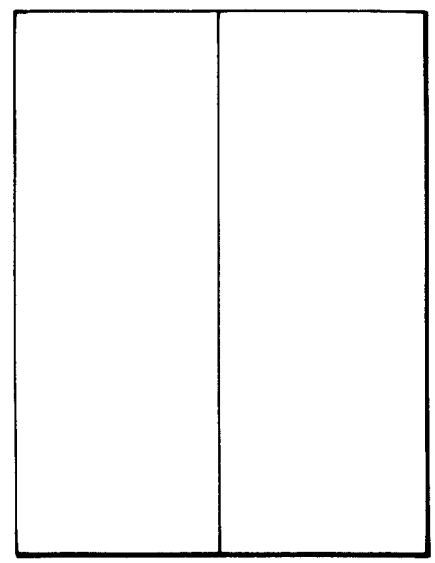
Figure 6:
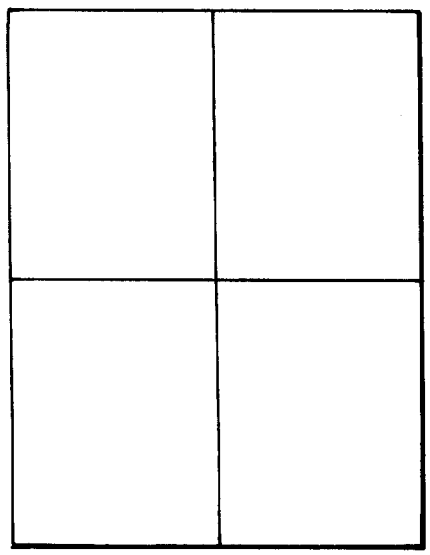
Figure 7:
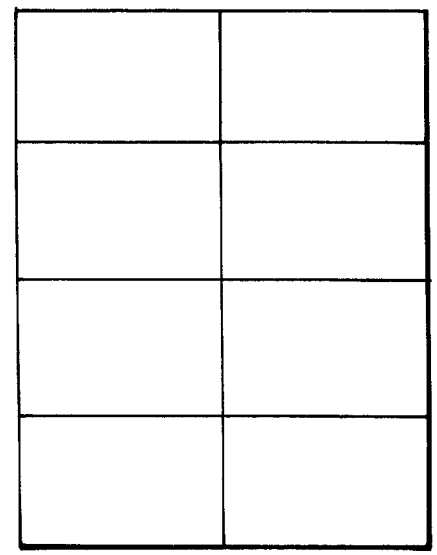

In FIG. 5, the image is sectored across the page from left to right. The densities calculated from each sector can be used to adjust the motor angular velocity "ω" or the printing rate "u" on the two sides of the image to reduce skew defects. In FIGS. 6 and 7, grid-like sectors are used to calculate the image densities in each sector in each color plane. The motor angular velocities "ω" and printing rates "u" can be modulated in each sector during printing.

Implementation of the present invention involves three steps: (1) calibration of the printer/media combination to determine the dependence of receiver velocity "v" on dye density and angular velocity "ω" of the motor, (2) calculation of the receiver velocity "v", motor angular velocity "ω", and/or printing rate "u" for each sector of each color plane to be printed, and (3) printing each sector of each color plane with the computed values.

A simple example for the calibration step is now described. The receiver medium velocity "v" is a function of the motor angular velocity "ω" and the densities of each sector of the color planes. To the first order approximation, this function can be simplified as:

$$v = \alpha_i \omega (1 + \beta_i * d_i),$$

where "$d_i$" is the average density of each sector of the color planes; "i" is the index for the sectors; and "$\alpha_i$" and "$\beta_i$" are constants.

The values for "$\alpha_i$" may be determined by measuring the positions of fiducial marks printed with a white field (that is, with $d_i=0$). This step takes into account the patch-to-patch speed differences caused by donor properties unrelated to image densities. Next, images with a uniform field of a single color plane are printed. Again, the receiver velocity is obtained from the positions of the fiducial marks. The velocity measurement is repeated at a few densities for this color. The value "$\beta_i$" for this color is determined by fitting the velocity values relative to the image density using the above function for "v".

Once the printer/media combination has been calibrated, receiver velocity "v", motor angular velocity "ω", and/or printing rate "u" for each sector of each color plane to be printed can be determined. The average dye density $d_i$ of each sector of each color plane is first computed.

It is generally desired that image resolution "R" is to be a constant. When the printing speed "u" is held constant, the target receiver velocity is:

$$v = u/R.$$

With the $\alpha_i$ and $\beta_i$ values determined in the calibration step, the motor angular velocity is determined as:

$$\omega = v/[\alpha_i(1+\beta_i*d_i)].$$

If the motor angular velocity ω is fixed, the printing rate "u" needs to vary according to the average density of each color plane sector:

$$u_i = Rv = R\alpha_i \omega (1+\beta_i*d_i).$$

As described previously, the desired speed modulation can be made to the motor angular velocity with a constant printing speed, to the printing speed with a constant motor angular velocity, or to both the motor angular velocity and the printing speed.

Figure 8A:
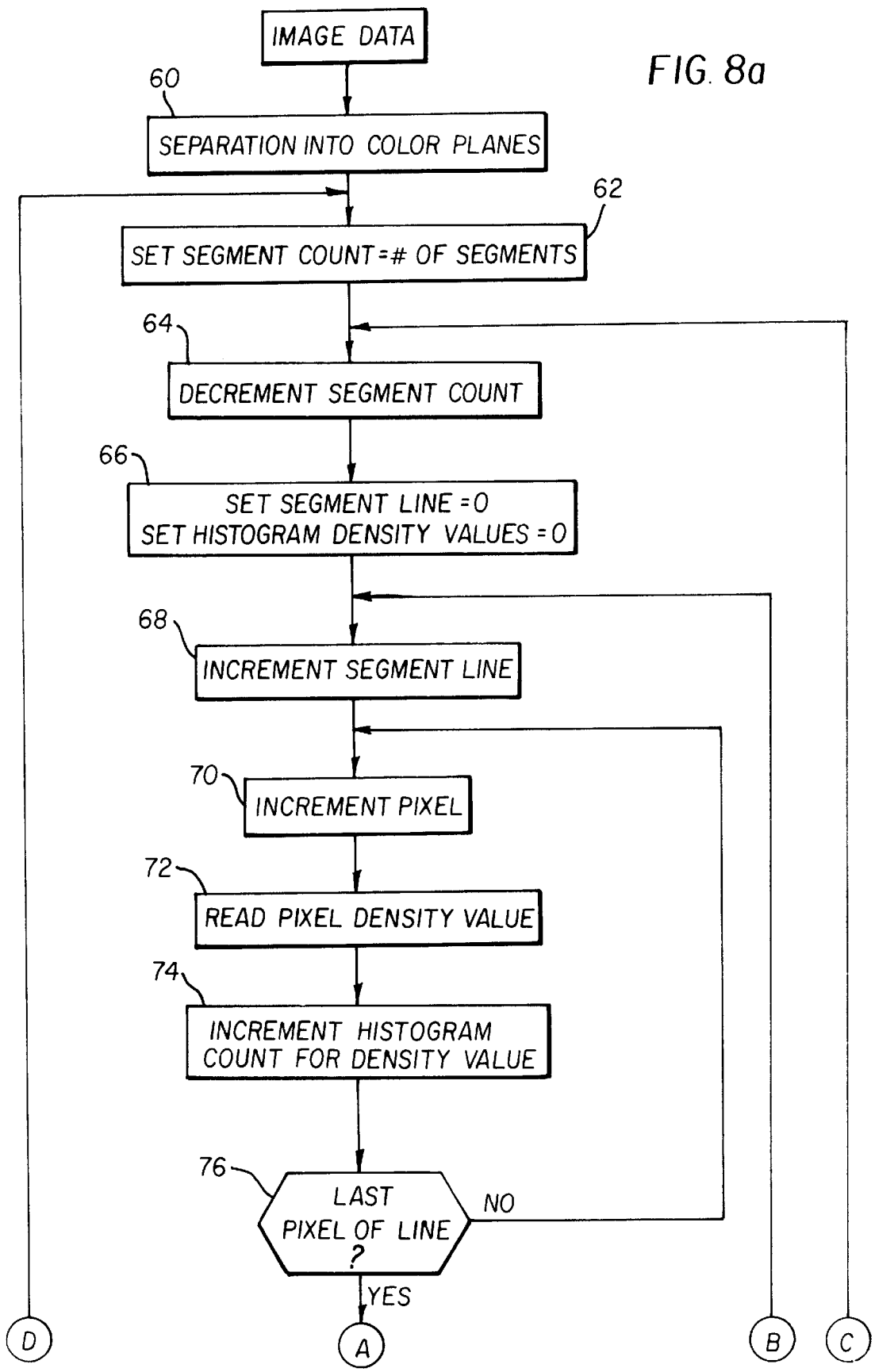
FIGS. 8a and 8b are portions of a logic flow chart showing the operation of the printer of FIGS. 1 and 2.
Figure 8B:
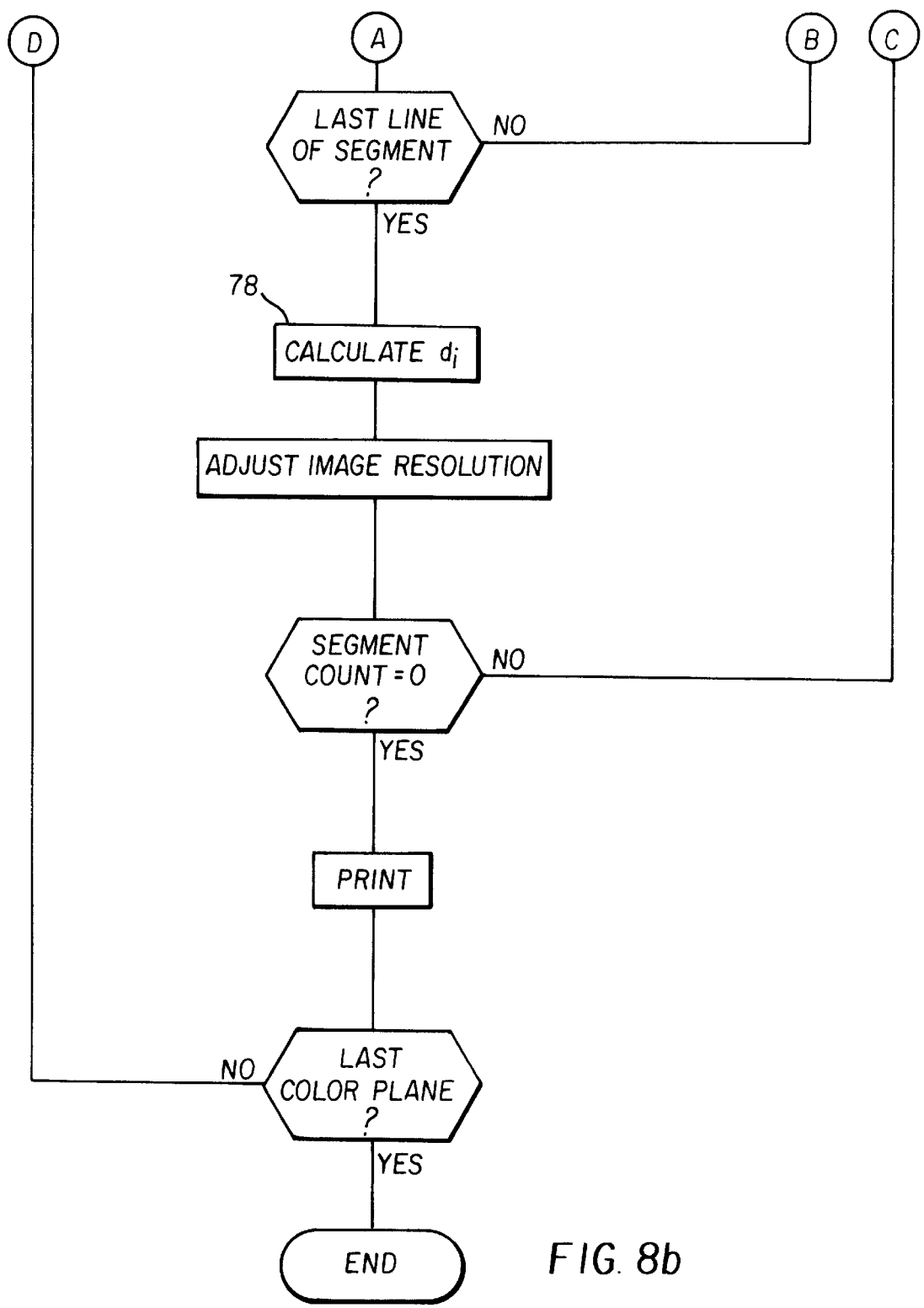

A flow chart for the process is illustrated in FIGS. 8a and 8b. Referring to the flow chart, color image data is separated at logic block 60 into three (C,M,Y) or four (C,M,Y,K) color planes. In accordance with pre-programmed or operator-inputted instructions, each color plane may be segmented such as illustrated in FIGS. 4–7, and the number of segments are entered as a "segment count" at logic block 62. For example, the segment count of FIG. 6 is four.

The "segment count" is decreased by one at logic block 64, and the segment line number and all density values of a histogram are set to zero at logic block 66. The segment line number and the pixel number within a print line are incremented at 68 and 70, respectively. As each pixel of a print line is incremented, its pixel density value is read (logic block 72), and the histogram count for that pixel density value is incremented at logic block 74.

If the present pixel is not the last pixel of the print line, as determined at logic block 76, the process is repeated for the next pixel in the print line. If the present pixel is the last pixel of the print line, the process is repeated for the next line of the present segment, if any.

After the last pixel of the last line of the segment has been reviewed, the average density "$d_i$" is calculated for the segment at logic block 78. Now, there is sufficient information, along with values of "$\alpha_i$" and "$\beta_i$", which are determined during calibration, to calculate an adjustment of the image resolution. The process is repeated for all color planes.

It will be understood that the image-content speed modifications can be determined by more detailed descriptions of the density distribution instead of by the single parameter (the average image density) used in the above example. In the flowchart of FIGS. 8a and 8b, the computation of the image-density histogram in each segment of each color plane is described. More sophisticated computations of motor angular velocity and printing speed based on the histograms are anticipated by this invention.

Advantages of the Present Invention

This invention can be used to eliminate the need for the conventional mechanism for registration, such as pinch rollers; thus reducing costs and space.

The calibration procedure compensates speed differences at near-zero image densities, effectively eliminating mis-registration caused by dye properties other than image densities.

The invention can be used to reduce mis-registration in combination with other mechanisms such as pinch rollers.

The invention is especially beneficial in images with a combination of photographs, business graphics, and text.

The invention is applicable to all printer types that print two or more color planes separately, for example, thermal dye transfer, thermal wax printers, and electrophotography.

The invention is applicable to donors with more than cyan, magenta, and yellow patches, for example, the donors with additional black or lamination patches.

The thermal printer market demands low cost, photographic quality printers. This necessitates the reduction of mechanical parts such as the pinch rollers that are used in high-end thermal printers. This invention provides a solution to this need with improved image quality and lowered cost.

The invention has been described in detail with particular reference to preferred embodiments thereof, but it will be understood that variations and modifications can be effected within the spirit and scope of the invention.

What is claimed is:

1. A color thermal dye transfer printer for producing superposed color plane images of varying image densities on a receiver medium, the printer comprising:

a printhead movable in a print direction relative to the receiver medium to produce images on the receiver medium at a printing rate, the images being of selectable resolution along the print direction;

means for determining the image density of each color plane image; and means for setting the image resolution for each color plane according to the image densities of the color plane images.

2. A color thermal dye transfer printer as set forth in claim 1 further comprising a media drive motor having a settable angular velocity, wherein image resolution is set by adjusting the angular velocity of the media drive motor.

3. A color thermal dye transfer printer as set forth in claim 1 wherein image resolution is adjusted by adjusting the velocity of relative movement of the printhead relative to the receiver medium.

4. A color thermal dye transfer printer as set forth in claim 1 wherein image resolution is adjusted by adjusting the printing rate.

5. A color thermal dye transfer printer for producing superposed color plane images of varying image densities on sectors of a receiver medium, the printer comprising:

a printhead movable in a print direction relative to the receiver medium to produce images on respective sectors of the receiver medium at a respective printing rate, the images being of selectable resolution along the print direction;

means for determining the image density of each color plane image in respective sectors; and means for setting the image resolution for each color plane image in respective sectors according to the image densities of the color plane sector images.

6. A color thermal dye transfer printer as set forth in claim 5 further comprising a media drive motor having a settable angular velocity, wherein image resolution of each sector is set by adjusting the angular velocity of the media drive motor.

7. A color thermal dye transfer printer as set forth in claim 5 wherein image resolution of each sector is adjusted by adjusting the velocity of relative movement of the printhead relative to the receiver medium.

8. A color thermal dye transfer printer as set forth in claim 5 wherein image resolution of each sector is adjusted by adjusting the printing rate.

9. A color thermal dye transfer printer as set forth in claim 5 wherein at least some of the sectors are aligned in the print direction.

10. A color thermal dye transfer printer as set forth in claim 5 wherein at least some of the sectors are aligned orthogonal to the print direction.

11. In a color thermal printer for producing a continuous tone image of superimposed color planes on a line-by-line basis, the printer having:

a printhead with selectively-addressable printing elements to print a line of associated pixels in a printing cycle, means for selectively addressing the printing elements for variable time durations depending on desired density levels of an associated pixel, and means for imparting relative motion between a receiver medium and the printhead so as to produce a variable density continuous tone image of each color plane on a line-by-line basis with a maximum density; the improvement comprising drive control apparatus for setting the image resolution for each color plane according to the density of the color plane image.

12. A thermal printer as defined in claim 11, further comprising means for advancing a dye-bearing donor medium past the printhead with the receiver medium.

13. A thermal printer as defined in claim 12, wherein the printhead comprises a linear array of closely spaced printing elements that span the receiver medium and the dye-bearing donor medium in a direction orthogonal to the print direction.

14. A process for producing a color thermal dye transfer print of superposed color plane images of varying image densities on a receiver medium, the process comprising the following steps:

producing images on the receiver medium at a printing rate, the images being of selectable resolution along the print direction;

determining the image density of each color plane image; and setting the image resolution for each color plane according to the image densities of the color plane images.

15. A process as set forth in claim 14 wherein image resolution is set by adjusting the angular velocity of a media drive motor.

16. A process as set forth in claim 14 wherein image resolution is adjusted by adjusting the velocity of relative movement of a printhead relative to the receiver medium.

17. A process as set forth in claim 14 wherein image resolution is adjusted by adjusting the printing rate.

* * * * *

UNITED STATES PATENT AND TRADEMARK OFFICE
CERTIFICATE OF CORRECTION

PATENT NO. : 5,841,459
DATED : Nov. 24, 1998
INVENTOR(S) : Xin Wen

It is certified that error appears in the above-identified patent and that said Letters Patent is hereby corrected as shown below:

On the title page, item [60] insert the following:

--Related U.S. Application Data
Provisional application No. 60/006,178, Nov. 2, 1995--.

Column 1, line 6, insert the following:

--CROSS REFERENCE TO RELATED APPLICATION
Reference is made to and priority claimed from U.S. Provisional application Ser. No. US 60/006,178, filed Nov. 2, 1995, entitle COLOR-TO-COLOR REGISTRATION IN THERMAL PRINTERS BY ADJUSTING IMAGE RESOLUTION BASED ON IMAGE CONTENT.--

Signed and Sealed this

Sixth Day of July, 1999

Attest:

Q. TODD DICKINSON

*Attesting Officer*    *Acting Commissioner of Patents and Trademarks*